(12) United States Patent
Tang et al.

(10) Patent No.: US 11,227,091 B1
(45) Date of Patent: Jan. 18, 2022

(54) PHYSICAL FAILURE ANALYSIS-ORIENTED DIAGNOSIS RESOLUTION PREDICTION

(71) Applicant: Siemens Industry Software Inc., Plano, TX (US)

(72) Inventors: Huaxing Tang, Wilsonville, OR (US); Jakub Janicki, Poznan (PL)

(73) Assignee: Siemens Industry Software Inc., Plano, TX (US)

( * ) Notice: Subject to any disclaimer, the term of this patent is extended or adjusted under 35 U.S.C. 154(b) by 0 days.

(21) Appl. No.: 17/175,011

(22) Filed: Feb. 12, 2021

(51) Int. Cl.
*G06F 30/333* (2020.01)
*G06F 30/398* (2020.01)
*G06F 30/3308* (2020.01)
*G06F 30/367* (2020.01)
*G06F 11/00* (2006.01)
G06F 119/02 (2020.01)

(52) U.S. Cl.
CPC .......... *G06F 30/333* (2020.01); *G06F 30/398* (2020.01); *G06F 11/008* (2013.01); *G06F 30/3308* (2020.01); *G06F 30/367* (2020.01); *G06F 2119/02* (2020.01)

(58) Field of Classification Search
CPC .. G06F 30/333; G06F 30/398; G06F 30/3308; G06F 30/367; G06F 2119/02; G06F 11/008; G01R 21/28
USPC .......... 716/136, 112; 703/16; 714/33, 732, 714/741; 702/59, 118
See application file for complete search history.

(56) References Cited

U.S. PATENT DOCUMENTS

| | | | | |
|---|---|---|---|---|
| 5,515,384 | A * | 5/1996 | Horton, III | G01R 31/318342 714/732 |
| 2008/0140330 | A1* | 6/2008 | Morioka | G05B 15/02 702/81 |
| 2011/0191643 | A1* | 8/2011 | Guo | G01R 31/318583 714/703 |
| 2015/0204939 | A1* | 7/2015 | Hsueh | G01R 31/318357 702/58 |

* cited by examiner

*Primary Examiner* — Phallaka Kik

(57) ABSTRACT

Various aspects of the disclosed technology relate to predicting physical failure analysis-oriented diagnosis resolution. Fault simulation is performed on a circuit design to derive test responses for a set of faults and test patterns for testing circuits fabricated according to the circuit design. The set of faults is grouped into groups of equivalent faults based on the test responses. A group of equivalent faults consists of faults having the same test responses for all test patterns in the test patterns that can activate the faults. A PFA (physical failure analysis)-oriented diagnosis resolution evaluation value is computed by averaging weighted sizes of the groups of equivalent faults. The weight factors for the groups of equivalent faults with sizes greater than a certain number being smaller than the weight factors for rest of the groups of equivalent faults.

20 Claims, 5 Drawing Sheets

Flow chart 400

PHYSICAL FAILURE ANALYSIS-ORIENTED DIAGNOSIS RESOLUTION PREDICTION

FIELD OF THE DISCLOSED TECHNIQUES

The presently disclosed techniques relates to circuit testing and fault diagnosis. Various implementations of the disclosed techniques may be particularly useful for predicting diagnosis resolution.

BACKGROUND OF THE DISCLOSED TECHNIQUES

Design complexity keeps increasing. A design often have over 1 billion gates, 100 million scan cells, and/or hundreds of cores. Manufactured such large circuits cannot avoid defects. To check whether a chip is fabricated according to the design, scan testing is usually employed. In this technique, a series of known values (test stimuli or test pattern) are shifted-in state elements called scan cells through their sequential inputs. These scan cells are interconnected into scan chains for scan testing. The shifting-in occurs by placing the integrated circuit in a special mode, known as shift mode, and then applying a series of clock pulses, called "shift pulses" or "shift clock pulses." Each shift clock pulse pushes a bit of test stimuli into a scan cell in each of the scan chains. This continues until all scan cells in the scan chains are filled with test pattern bits. Then, one or more clock pulses, called "capture pulses" or "capture clock pulses," are applied to the circuit as they would be in normal operation. This is referred to as capture mode. After the test pattern bits are injected into the circuit, the results of the test (test responses) are "captured" and stored in the scan cells. The circuit then returns to shift mode, and with each additional clock pulse, a bit of the test responses is pushed or shifted out as each bit of new test pattern is pushed or shifted in. The shifted out test responses are then compared with expected results to determine any errors. Shift mode and capture mode together may be called as test mode.

The captured test responses not only can reveal whether or not a chip has defects but also can help identify and locate defects. The process that determines, based on test patterns and test responses, the most likely faulty locations and fault types for a given failing device is referred to as scan diagnosis. Scan diagnosis results can guide physical failure analysis (PFA) to locate defects and identify the root cause. The higher the diagnosis resolution and accuracy, the more efficient the physical failure analysis process. Scan diagnosis has also been applied directly to yield analysis. Volume diagnosis results are analyzed to identify systematic yield limiters. Many factors such as circuit design itself, test patterns, fault models, and diagnosis algorithms can affect the diagnosis resolution. A software tool capable of predicting diagnosis resolution can help engineers decide whether to modify a circuit design or to use additional test patterns to improve diagnosis resolution. The improved diagnosis resolution can lead to small areas for PFA, reduced turn-around time and cost, and an improved PFA success rate.

BRIEF SUMMARY OF THE DISCLOSED TECHNIQUES

Various aspects of the disclosed technology relate to predicting physical failure analysis-oriented diagnosis resolution. In one aspect, there is a method, executed by at least one processor of a computer, comprising receiving a circuit design, a set of faults for the circuit design, and test patterns for testing circuits fabricated according to the circuit design; performing fault simulation on the circuit design to derive test responses for the set of faults and the test patterns; grouping the set of faults into groups of equivalent faults based on the test responses, a group of equivalent faults consisting of faults having the same test responses for all test patterns in the test patterns that can activate the faults; computing a PFA (physical failure analysis)-oriented diagnosis resolution evaluation value by averaging weighted sizes of the groups of equivalent faults, weight factors for the groups of equivalent faults with sizes greater than a certain number being smaller than weight factors for rest of the groups of equivalent faults; and storing the PFA-oriented diagnosis resolution evaluation value in a non-transitory computer-readable media.

The method may further comprise: adding more test patterns to the test patterns to form a new set of test patterns; and repeating the performing, the grouping, the computing, and the storing by replacing the test patterns with the new set of test patterns.

The method may further comprise: computing an upper bound value for the PFA-oriented diagnosis resolution evaluation value by averaging weighted sizes of groups of structure-based equivalent faults; and determining whether to modify the circuit design based on the upper bound value or whether to add more test patterns to the test patterns based on comparing the PFA-oriented diagnosis resolution evaluation value with the upper bound value.

The weight factors for the groups of equivalent faults with sizes smaller than or equal to the certain number may be set to be "1". The weight factors for the groups of equivalent faults with sizes greater than the certain number may be computed based on a function decreasing with respect to the size. The function may be an exponential function with a base being a preset value and the exponent being the size.

For each set of collapsed equivalent faults in the set of faults, the performing fault simulation may be limited to one fault in the each set of collapsed equivalent faults. The set of faults may be stuck-at faults.

The grouping may comprise: compressing test responses into test response signatures; and comparing test response signatures for different faults to determine equivalent faults. Each of the test response signatures may be a 64-bit word.

In another aspect, there are one or more non-transitory computer-readable media storing computer-executable instructions for causing one or more processors to perform the above method.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclosed techniques. Thus, for example, those skilled in the art will recognize that the disclosed techniques may be embodied or carried out in a manner that achieves or optimizes one advantage or group of advantages as taught herein without necessarily achieving other objects or advantages as may be taught or suggested herein.

DETAILED DESCRIPTION OF THE DISCLOSED TECHNIQUES

General Considerations

Various aspects of the disclosed technology relate to predicting diagnosis resolution for physical failure analysis. In the following description, numerous details are set forth for the purpose of explanation. However, one of ordinary skill in the art will realize that the disclosed technology may be practiced without the use of these specific details. In other instances, well-known features have not been described in details to avoid obscuring the disclosed technology.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods.

The detailed description of a method or a device sometimes uses terms like "perform" and "group" to describe the disclosed method or the device function/structure. Such terms are high-level descriptions. The actual operations or functions/structures that correspond to these terms will vary depending on the particular implementation and are readily discernible by one of ordinary skill in the art.

As used in this disclosure, the singular forms "a," "an," and "the" include the plural forms unless the context clearly dictates otherwise. Additionally, the term "includes" means "comprises." Additionally, as used herein, the term "design" is intended to encompass data describing an entire integrated circuit device. This term also is intended to encompass a smaller group of data describing one or more components of an entire device such as a portion of an integrated circuit device nevertheless.

Illustrative Operating Environment

Figure 1:
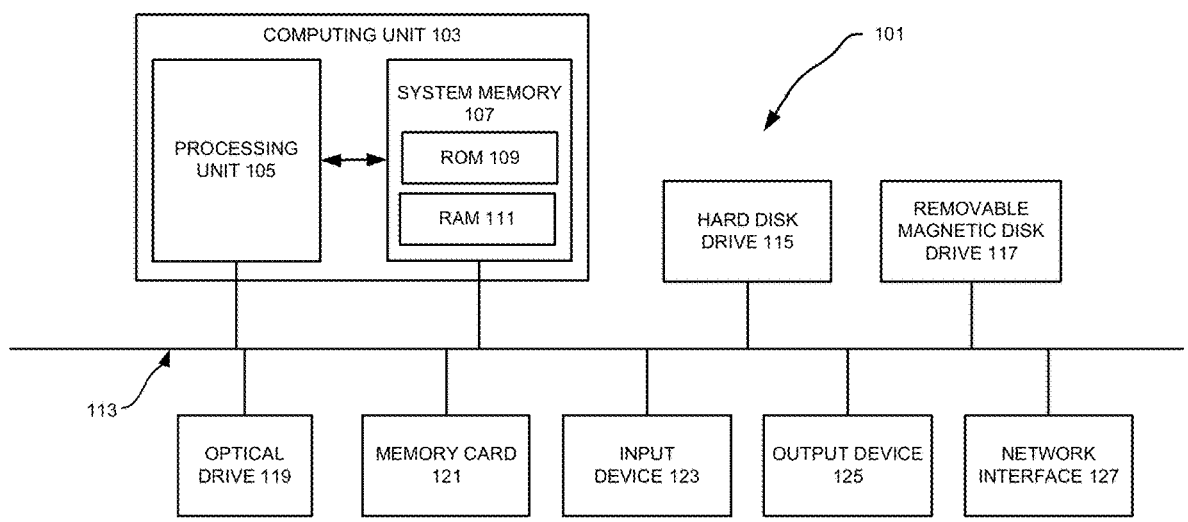
FIG. 1 illustrates a programmable computer system with which various embodiments of the disclosed technology may be employed.

Various examples of the disclosed technology may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but it will conventionally be a microprocessor. The system memory 107 may include both a read-only memory (ROM) 109 and a random access memory (RANI) 111. As will be appreciated by those of ordinary skill in the art, both the read-only memory (ROM) 109 and the random access memory (RANI) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it is not intended to be limiting. Various embodiments of the disclosed technology may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the disclosed technology may be implemented using a multi-processor computer, a plurality of single and/or multiprocessor computers arranged into a network, or some combination of both.

Design for Test, Test Pattern Generation, and Testing

The reduction in feature size increases the probability that a manufacture defect in the integrated circuit will result in a faulty chip. A very small defect can result in a faulty transistor or interconnecting wire. Even a single faulty transistor or wire can cause the entire chip to function improperly. Manufacture defects are unavoidable nonetheless, no matter whether the manufacturing process is at the prototype stage or the high-volume manufacturing stage. It is thus necessary to test chips during the manufacturing process. Diagnosing faulty chips is also needed to ramp up and to maintain the manufacturing yield.

Testing typically includes applying a set of test stimuli (test patterns) to the circuit-under-test and then analyzing responses generated by the circuit-under-test. Functional testing attempts to validate that the circuit-under-test operates according to its functional specification while structural testing tries to ascertain that the circuit-under-test has been assembled correctly from some low-level building blocks as specified in a structural netlist and that these low-level building blocks and their wiring connections have been manufactured without defect. For structural testing, it is assumed that if functional verification has shown the correctness of the netlist and structural testing has confirmed the correct assembly of the structural circuit elements, then the circuit should function correctly. Structural testing has been widely adopted at least in part because it enables the test (test pattern) generation to focus on testing a limited number of relatively simple circuit elements rather than having to deal with an exponentially exploding multiplicity of functional states and state transitions.

To make it easier to develop and apply test patterns, certain testability features are added to circuit designs, which is referred to as design for test or design for testability (DFT). Scan testing is the most common DFT method. In a basic scan testing scheme, all or most of internal sequential state elements (latches, flip-flops, et al.) in a circuit design are made controllable and observable via a serial interface. These functional state elements are usually replaced with dual-purpose state elements called scan cells. Scan cells are connected together to form scan chains—serial shift registers for shifting in test patterns and shifting out test responses. A scan cell can operate as originally intended for functional purposes (functional/mission mode) and as a unit in a scan chain for scan (scan mode). A widely used type of scan cell includes an edge-trigged flip-flop with two-way multiplexer for the data input. The two-way multiplexer is typically controlled by a single control signal called scan_enable, which selects the input signal for a scan cell from either a scan signal input port or a system signal input port. The scan signal input port is typically connected to an output of another scan cell while the system signal input port is connected to the functional logic. Scan cells can serve as both a control point and an observation point. Control points can be used to set certain logic values at some locations of the circuit-under-test, exciting (activating) a fault and propagating the incorrect value to an observation point. Scan testing allows the test equipment to access gates deeply embedded through the primary inputs/outputs and/or some physical test points and can remove the need for complicated state transition sequences when trying to control or observe what is happening at some internal circuit element.

Test patterns for scan testing are typically generated through an automatic test pattern generation (ATPG) process. ATPG usually focuses on a set of faults derived from a gate-level fault model. A defect is a flaw or physical imperfection caused in a device during the manufacturing process. A fault model (or briefly a fault) is a description of how a defect alters design behavior. For a given target fault, ATPG comprises two phases: fault activation and fault propagation. Fault activation establishes a signal value at the fault site opposite that produced by the fault. Fault propagation propagates the fault effect forward by sensitizing a path from a fault site to a scan cell or a primary output. A fault at a site is said to be detected by a test pattern if a test response value captured by a scan cell or a primary output is different than the expected value. The objective of ATPG is to find a test pattern that, when applied to the circuit, enables testers to distinguish between the correct circuit behavior and the faulty circuit behavior caused by one or more particular faults. Effectiveness of ATPG is measured by the fault coverage achieved for the fault model and the number of generated vectors (test pattern counts), which should be directly proportional to test application time. Here, the fault coverage is defined as a ratio of the number of detected faults vs. the total number of faults.

The most popular fault model used in practice is the single stuck-at fault model. In this model, one of the signal lines in a circuit is assumed to be stuck at a fixed logic value, regardless of what inputs are supplied to the circuit. The stuck-at fault model is a logical fault model because no delay information is associated with the fault definition. Delay faults cause errors in the functioning of a circuit based on its timing. They are caused by the finite rise and fall time periods of the signals in the gates, as well as, the propagation delay of interconnects between the gates. Transition faults are used for their simplicity in modeling spot defects that affect delays at inputs or outputs of gates. Under scan-based tests, the transition faults are associated with an extra delay that is large enough to cause the delay of any path through the fault site to exceed the clock period. Cell internal fault models can be derived using transistor-level circuit simulations (analog simulations). This approach can pinpoint the defect location within a cell for various cell internal defects.

During the circuit design and manufacturing process, a manufacturing test screens out chips (dies) containing defects. The test itself, however, does not identify the reason for the unacceptable low or fluctuating yield that may be observed. Physical failure analysis (PFA) can inspect the faulty chip to locate the defect location(s) and to discover the root cause. The process usually includes etching away certain layers and then imaging the silicon surface by scanning electronic microscopy or focused ion beam systems. This PFA process is laborious and time consuming. To facilitate the PFA process, diagnosis (also referred to as scan diagnosis) is often employed to narrow down possible locations of the defect(s) based on analyzing the fail log (fail file, failure file). The fail log typically contains information about when (e.g., tester cycle), where (e.g., at what tester channel), and how (e.g., at what logic value) the test failed and which test patterns generate expected test responses. The layout information of the circuit design may also be employed to further reduce the number of defect suspects.

Diagnosis includes logic diagnosis (sometimes referred to as scan diagnosis or diagnosis) and chain diagnosis. Logic diagnosis may employ a fault dictionary or directly examine the syndrome (i.e., the effect) of the failing chip to determine likely defect locations (defect suspects). The latter approach may include structural pruning (backtracing), fault injection and evaluation (fault simulation for both failing and passing test patterns). The quality of diagnosis can be measured by diagnostic resolution (the number of the real defects vs. the number of the defect suspects). Diagnostic resolution is linked not only to the algorithm used for diagnosis but also to the test patterns used for the manufacturing test (manufacturing test patterns). To enhance the diagnosis quality, a diagnostic test pattern generation process may be employed. This process generates test patterns that can refine the set of defect suspects.

Chain diagnosis determines scan cells that are likely to be defective. Scan elements and related clocking circuitry can take up about 30% of silicon area of an IC chip. It has been reported that scan chain failures account for almost 50% of chip failure in some cases. Chain diagnosis is thus important to guide physical failure analysis and yield learning process. In a chain diagnosis process, two types of test patterns may be used. The first type is called chain patterns. A chain pattern is a pattern used in a process comprising shift-in and shift-out without pulsing capture clocks. The other type is often referred to as scan patterns. A scan pattern is a pattern used in a process comprising shift-in, one or multiple capture clock cycles, and shift-out, and the scan patterns include patterns generated by ATPG for testing system logic, special chain diagnostic patterns generated only for scan chain diagnosis purpose and some special functional patterns. Chain patterns can be used to test the integrity of scan chains and/or determine fault models associated with faulty scan chains while scan patterns can be used to inject certain values to some scan cells for locating defective scan cells. Some techniques for chain diagnosis are disclosed in U.S. Pat. Nos. 7,788,561; 8,615,695; 8,316,265; 8,689,070; 8,843,796; and 9,086,459, of which all are hereby incorporated herein by reference.

Test application in chip manufacturing test is normally performed by automatic test equipment (ATE) (a type of testers). Scan-based tests consume significant amounts of storage and test time on ATE. The data volume increases with the number of logic gates on the chip and the same holds for the number of scan cells. Yet, practical considerations and ATE specifications often limit both the number of pins available for scan in/out and the maximum scan frequency. It is highly desirable to reduce the amount of test data that need to be loaded onto ATE and ultimately to the circuit under test. Fortunately, test patterns are compressible mainly because only 1% to 5% of test pattern bits are typically specified bits (care bits) while the rest are unspecified bits (don't-care bits). Unspecified bits can take on any values with no impact on the fault coverage. Test compression may also take advantage of the fact that test cubes tend to be highly correlated. A test cube is a deterministic test pattern in which the don't-care bits are not filled by ATPG. The correlation exists because faults are structurally related in the circuit.

All of the above mentioned processes, design insertion for testing, test pattern generation, and logic diagnosis, are normally performed by various electronic design automation tools such as those in the Tessent family of software tools available from Mentor Graphics Corporation, Wilsonville, Oreg.

Equivalent Faults

It is possible that two or more faults produce the same behavior for all test patterns employed for circuit testing. These faults are called equivalent faults. Equivalent faults comprise structure-based equivalent faults and test pattern-based equivalent faults. Structure-based equivalent faults are faults that are equivalent due to particular circuitry and that cannot be distinguished by any test patterns. Test pattern-based equivalent faults are faults that are equivalent for all test patterns employed for circuit testing but can be, at least theoretically, separated apart using additional test patterns.

Figure 2A:
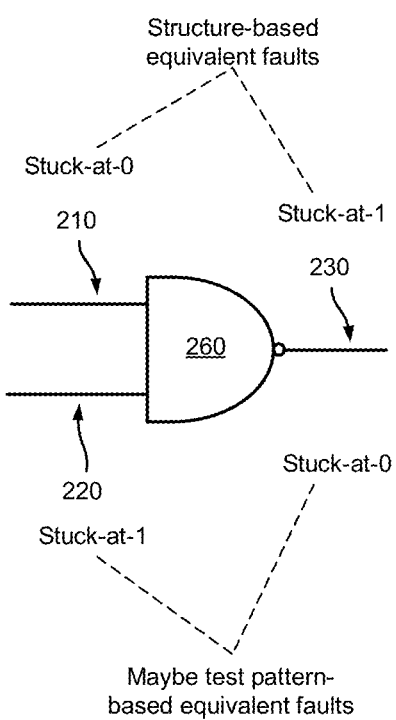
FIG. 2A illustrates examples of test pattern-based equivalent faults and structure-based equivalent faults associated with an NAND gate.

FIG. 2A illustrates examples of test pattern-based equivalent faults and structure-based equivalent faults associated with an NAND gate 260. For this NAND gate 260, a stuck-at-0 fault at an input 210, a stuck-at-0 fault at an input 220, and a stuck-at-1 fault at an output 230 are structure-based equivalent faults with respect to each other. If any one or more of these three faults are present, the output 230 will always be at "1" no matter what values are applied to the two inputs 210 and 220. Thus, these three faults are inherently indistinguishable.

On the other hand, a stuck-at-1 fault at one of the two inputs 210 and 220 and a stuck-at-0 fault at the output 230 are not structure-based equivalent faults, but can be pattern-based equivalent faults. For example, when a test pattern set the two inputs 210 and 220 at "1" and "0", respectively, the output 230 should have a good-machine value of "1". If the output 230 is shown to be "0", the fault may be a stuck-at-0 at the output 230 or a stuck-at-1 at the input 220. A test pattern that applies a "0" to the input 210 can be used to distinguish these two faults: If the test response to this test pattern shows that the output 230 is still at "0", then the fault is the stuck-at-0 at the output 230; otherwise, the fault is the stuck-at-1 at the input 220. However, if the pattern set used for testing the chip does not include the test pattern that sets the input 210 at "0" due to various reasons, the stuck-at-1 fault at the input 220 and the stuck-at-0 fault at the output 230 cannot be separated and thus are pattern-based equivalent faults.

Figure 2B:
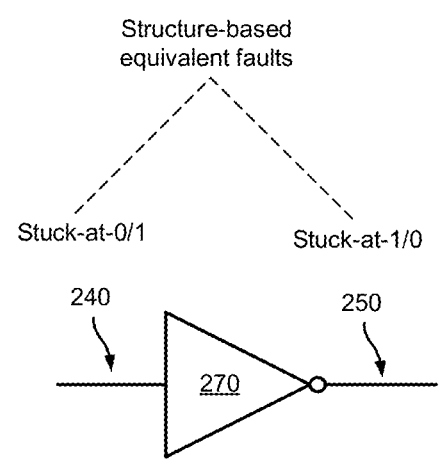
FIG. 2B illustrates an example of structure-based equivalent faults associated with an inverter.

FIG. 2B illustrates an example of structure-based equivalent faults associated with an inverter 270. Specifically, a stuck-at-0 fault at the input 240 of the inverter 270 and a stuck-at-1 fault at the output 250 of the inverter 270 are structure-based equivalent faults. This is because the output 250 always has a value of 1 no matter what values are applied to the input 240 and no matter whether the inverter 270 has the stuck-at-0 fault at the input 240 and the stuck-at-1 fault at the output 250. Similarly, a stuck-at-1 fault at the input 240 of the inverter 270 and a stuck-at-0 fault at the output 250 of the inverter 270 are another set of structure-based equivalent faults.

For test pattern generation, any single fault from a set of structure-based equivalent faults can represent the whole set. Removing equivalent faults from entire set of structure-based faults is called fault collapsing. Fault collapsing significantly decreases the number of faults to check, speeding up the test pattern generation process.

Diagnosis Resolution Analyzer

Figure 3:
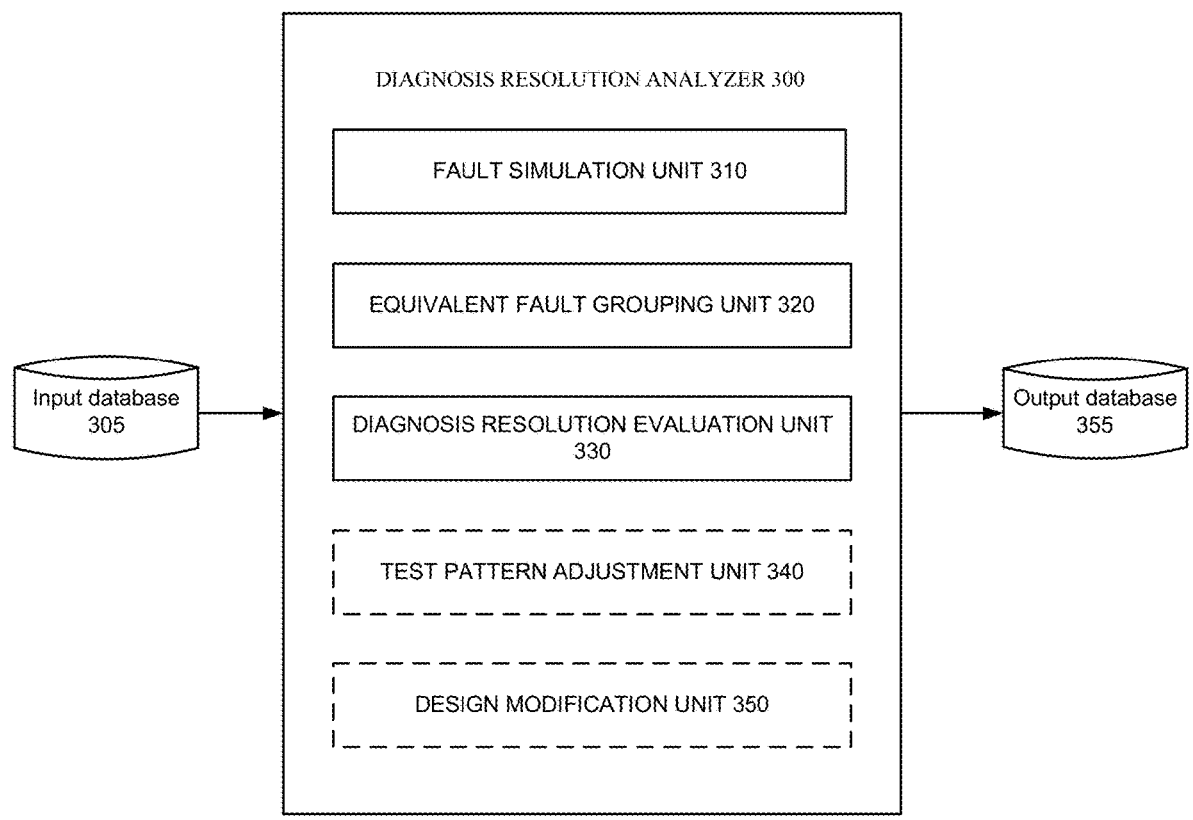
FIG. 3 illustrates an example of a diagnosis resolution analyzer according to various embodiments of the disclosed technology.

FIG. 3 illustrates an example of a diagnosis resolution analyzer 300 according to various embodiments of the disclosed technology. As seen in this figure, the diagnosis resolution analyzer 300 includes a fault simulation unit 310, an equivalent fault grouping unit 320, and a diagnosis resolution evaluation unit 330. Some implementations of the diagnosis resolution analyzer 300 may cooperate with (or incorporate) one or more of a test pattern adjustment unit 340, a design modification unit 350, an input database 305 and an output database 355.

As will be discussed in more detail below, the diagnosis resolution analyzer 300 can receive a circuit design, a set of faults for the circuit design, and test patterns for testing the circuit design from the input database 305. The fault simulation unit 310 can perform fault simulation on the circuit design to derive test responses for the set of faults and the test patterns. Based on the test responses, the equivalent fault grouping unit 320 can group the set of faults into groups of equivalent faults, a group of equivalent faults being faults having the same test responses for all test patterns in the test patterns that can activate the faults. The diagnosis resolution evaluation unit 330 can compute a PFA (physical failure analysis)-oriented diagnosis resolution evaluation value by averaging weighted sizes of the groups of equivalent faults, weight factors for the groups of equivalent faults with sizes greater than a certain number being smaller than weight factors for rest of the groups of equivalent faults. The diagnosis resolution analyzer 300 can then store the PFA-oriented diagnosis resolution evaluation value in the output database 355. Optionally, the diagnosis resolution evaluation unit 330 can computes an upper bound value for the PFA-oriented diagnosis resolution evaluation value by averaging weighted sizes of groups of structure-based equivalent faults. The diagnosis resolution analyzer 300 can determine whether to use the design modification unit 350 to modify the circuit design based on the upper bound value or whether to use the test pattern adjustment unit 340 to add more test patterns to the test patterns based on comparing the PFA-oriented diagnosis resolution evaluation value with the upper bound value.

As previously noted, various examples of the disclosed technology may be implemented by one or more computing systems, such as the computing system illustrated in FIG. 1. Accordingly, one or more of the fault simulation unit 310, the equivalent fault grouping unit 320, the diagnosis resolution evaluation unit 330, the test pattern adjustment unit 340, and the design modification unit 350 may be implemented by executing programming instructions on one or more processors in one or more computing systems, such as the computing system illustrated in FIG. 1. Correspondingly, some other embodiments of the disclosed technology may be implemented by software instructions, stored on a non-transitory computer-readable medium, for instructing one or more programmable computers/computer systems to perform the functions of one or more of the fault simulation unit 310, the equivalent fault grouping unit 320, the diagnosis resolution evaluation unit 330, the test pattern adjustment unit 340, and the design modification unit 350. As used herein, the term "non-transitory computer-readable medium" refers to computer-readable medium that are capable of storing data for future retrieval, and not propagating electro-magnetic waves. The non-transitory computer-readable medium may be, for example, a magnetic storage device, an optical storage device, or a solid state storage device.

It also should be appreciated that, while the fault simulation unit 310, the equivalent fault grouping unit 320, the diagnosis resolution evaluation unit 330, the test pattern adjustment unit 340, and the design modification unit 350 are shown as separate units in FIG. 3, a single computer (or a single processor within a master computer) or a single computer system may be used to implement some or all of these units at different times, or components of these units at different times.

With various examples of the disclosed technology, the input database 305 and the output database 355 may be implemented using any suitable computer readable storage device. That is, either of the input database 305 and the output database 355 may be implemented using any combination of computer readable storage devices including, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable storage devices may also include magnetic cassettes, magnetic tapes, magnetic disks or other magnetic storage devices, holographic storage devices, or any other non-transitory storage medium that can be used to store desired information. While the input database 305 and the output database 355 are shown as separate units in FIG. 3, a single data storage medium may be used to implement some or all of these databases.

PFA-Oriented Diagnosis Resolution Evaluation

Figure 4:
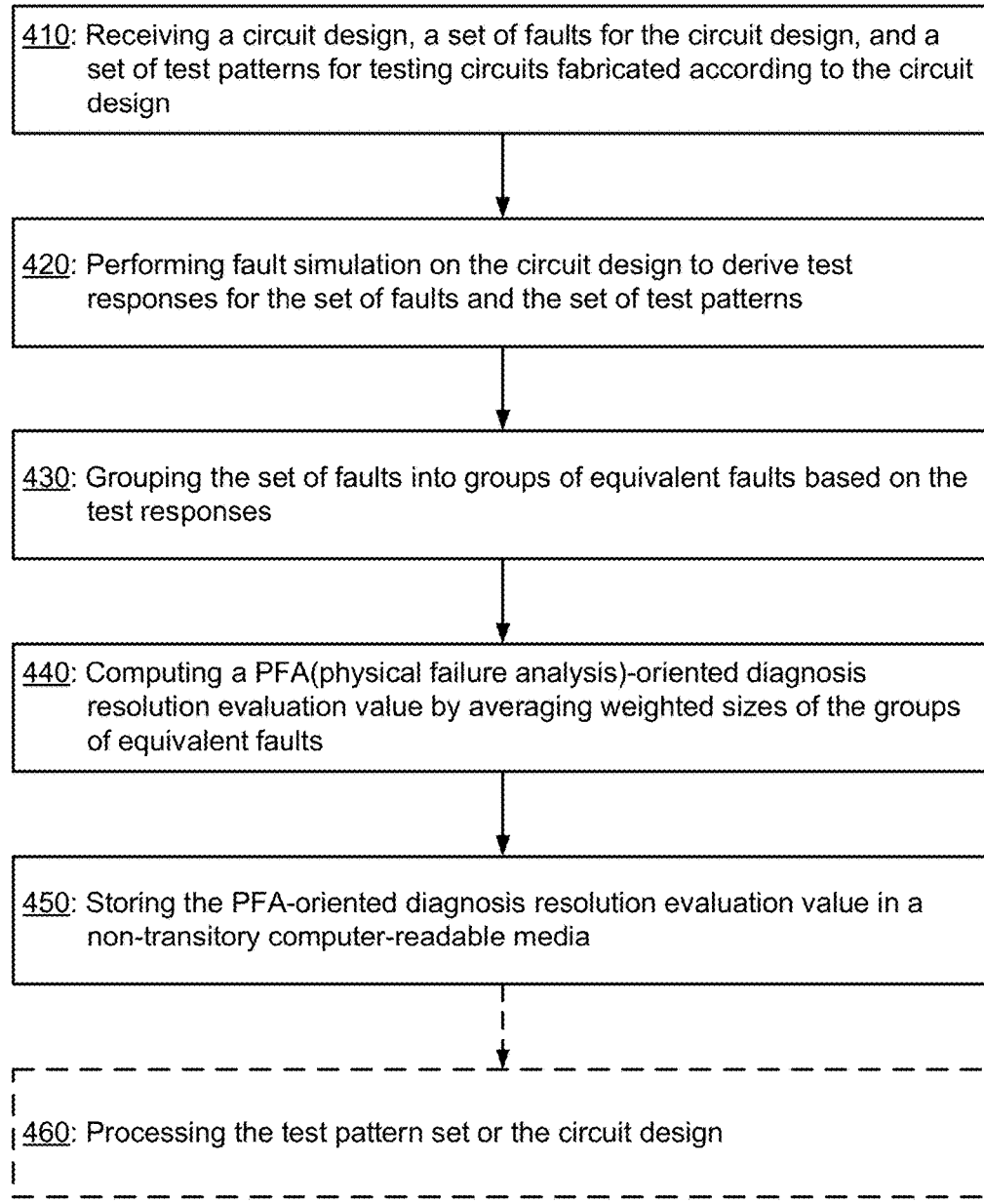
FIG. 4 illustrates a flowchart showing a process for predicting PFA-oriented diagnosis resolution that may be implemented according to various examples of the disclosed technology.

FIG. 4 illustrates a flowchart 400 showing a process for predicting PFA-oriented diagnosis resolution that may be implemented according to various examples of the disclosed technology. For ease of understanding, methods of PFA-oriented diagnosis prediction that may be employed according to various embodiments of the disclosed technology will be described with reference to the diagnosis resolution analyzer 300 in FIG. 3 and the flow chart 400 illustrated in FIG. 4. It should be appreciated, however, that alternate implementations of a diagnosis resolution analyzer may be used to perform the methods of PFA-oriented diagnosis prediction termination illustrated by the flow chart 400 according to various embodiments of the disclosed technology. Likewise, the diagnosis resolution analyzer 300 may be employed to perform other methods of PFA-oriented diagnosis prediction according to various embodiments of the disclosed technology.

In operation 410, the diagnosis resolution analyzer 300 receives a circuit design, a set of faults for the circuit design, and test patterns for testing circuits fabricated according to the circuit design from the input database 305. The circuit design may be a whole circuit design or a portion of a design such as a core or a circuit block. Many integrated circuits now include billions of transistors. It is virtually impossible to design them flat (with no partitioning). Electronic Design Automation (EDA) tools would not be able to process them efficiently. Additionally, there is significant reuse of Intellectual Property (IP) from one design to another. Large designs, known as Systems-On-A-Chip (SOCs), include a large number of "cores" that are used as building blocks (also referred to circuit blocks). Each core is usually designed and validated individually first, then integrated with other cores to form the entire SOC. This is known as hierarchical design. Ideally, most of the design and validation work is done at the core level, which is smaller and more manageable. This leaves the integration and chip-level validation to be done at the top level. All work done at the core level can also be done earlier when working on the core, and moved out of the critical path when the SOC comes together closer to the tape-out deadline. Test patterns generated for testing a core may be reused for testing multiple instances of the core, reducing not only pattern generation time but also testing time.

The set of faults for the circuit design may be all stuck-at faults. Additionally, the set of faults may include transition faults, open faults, bridge faults, cell internal faults, or any combination thereof. The test patterns may be the whole set of test patterns used for testing circuits fabricated according to the circuit design or a subset of them. In some cases, however, the diagnosis resolution analyzer 300 may use only a subset of test patterns as the test patterns for PFA-oriented diagnosis prediction. To achieve a certain test coverage, hundreds or thousands of test patterns are usually used. When one test pattern generates a faulty test response from a circuit, the tester may stop applying the rest of test patterns if the only concern is whether the circuit is defective or not. On the other hand, diagnosis needs test responses from more test patterns to achieve certain resolution and accuracy. This can increase test time and memory requirement for the tester. To balance the test costs and the diagnosis need, only test responses for a subset of test patterns may be collected and saved in some situations.

In operation 420, the equivalent fault grouping unit 320 performs fault simulation on the circuit design to derive test responses for the set of faults and the test patterns. With various implementations of the disclosed technology, the equivalent fault grouping unit 320 can inject a fault from the set of faults into the circuit, apply a test pattern in the test patterns to the circuit through scan chains, and compute a test response collected by the scan chains. Typically, not every test pattern can activate the injected fault. For example, a test pattern needs to set the input 240 of the inverter 270 in FIG. 2B as "1" to activate the stuck-at-1 fault at the output 250. If the stuck-at-1 fault is not present, the inverter 270 can output a "0" signal which may then be propagated to one or more observation points (scan cells/primary outputs). If the stuck-at-1 fault is inject at the output 250 and the "1" signal is propagated to and captured by one or more scan cells/primary outputs, the fault is then detected by the test pattern by comparing the test response with the good-machine test response. In a conventional fault simulation, once a fault is found to be detected by a test pattern, the simulator may stop the simulation using the rest of the test patterns. The equivalent fault grouping unit 320, however, uses all test patterns in the test patterns to perform simulation for a particular fault. The test responses associated with the test patterns capable of detecting the fault will be used in the following operations.

During a pattern generation process, structure-based equivalent faults are typically collapsed into a group and only one fault from each group of structure-based equivalent faults is used for generating test patterns. Similarly, the equivalent fault grouping unit 320 may perform fault simulation for only one fault from each group of structure-based equivalent faults.

In operation 430, the equivalent fault grouping unit 320 groups the set of faults into groups of equivalent faults based on the test responses. A group of equivalent faults consists of faults having the same test responses for all test patterns in the test patterns that can activate the faults. A group of equivalent faults may include structure-based equivalent faults, pattern-based equivalent faults, or both. A group of equivalent faults may include only one fault, which means the fault has no equivalent fault in the set of faults. The equivalent fault grouping unit 320 may compress the test responses into test response signatures. Various compression methods can be employed. One example is to use a 64-bit word to represent a test response. A linear-feedback shift register (LFSR), bit manipulation shifting, or the like may be used for the compression. The equivalent fault grouping unit 320 may then compare the test response signatures to determine equivalent faults. Using compressed test response can reduce the computing resources needed such as computer memory and increase the computation speed.

In operation 440, the diagnosis resolution evaluation unit 330 computes a PFA (physical failure analysis)-oriented diagnosis resolution evaluation value by averaging weighted sizes of the groups of equivalent faults. Here, weight factors for the groups of equivalent faults with sizes greater than a certain number are smaller than weight factors for rest of the groups of equivalent faults. According to some embodiments of the disclosed technology, the diagnosis resolution evaluation unit 330 can use the following equation to compute the PFA (physical failure analysis)-oriented diagnosis resolution evaluation value V:

$$V = \frac{1}{N}\sum_{i=1}^{M} \text{far}(n_i) * n_i \quad (1)$$

where $n_i$ is the number of equivalent faults in the $i_{th}$ group of equivalent faults (the size of the $i_{th}$ group of equivalent faults), M is the total number of the groups of equivalent faults, N is the total number of faults in the set of faults, and f ar($n_i$) is the weight factor for the $i_{th}$ group of equivalent faults.

The weight factor f ar ($n_i$) may adopt the following form:

$$f\,ar(n_i)=1.0, \text{ if } n_i \leq m \quad (2)$$

$$f\,ar(n_i)=c^{n_i-m}, \text{ if } n_i > m \quad (3)$$

where c and m are constants. The constant m is the certain number mentioned above. It may be set according to the number of suspects in a diagnostic report that would be tolerated by PFA. If a diagnostic report of a defective chip has too many suspects, the defective chip may not be a good candidate for PFA due to the low likelihood of success and/or the time involved. The value of c can be set to be, for example, 0.5 or 0.001. The larger the value of c, the more contribution to the PFA (physical failure analysis)-oriented diagnosis resolution evaluation value V from the groups of equivalent faults that have more equivalent faults.

Figure 5:
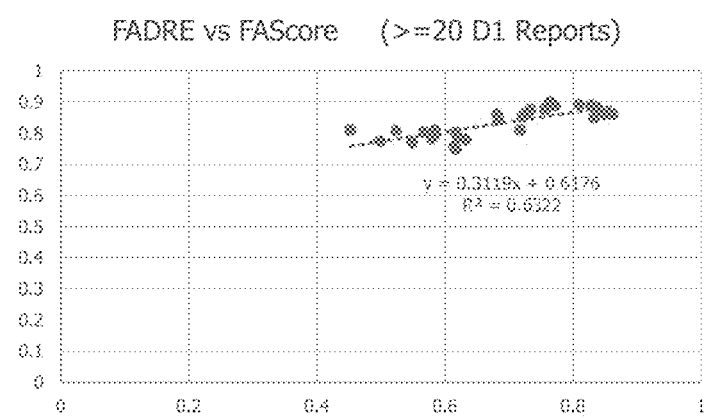
FIG. 5 illustrates an example of a graph of PFA-oriented diagnosis resolution evaluation values (FADRE) vs. PFA-oriented diagnosis report scores (FAScore) obtained based on diagnosis reports.

FIG. 5 illustrates an example of a graph of the PFA (physical failure analysis)-oriented diagnosis resolution evaluation values (FADRE) vs. PFA (physical failure analysis)-oriented diagnosis report scores (FAScore) obtained based on diagnosis reports. The following equation is employed to compute the PFA-oriented diagnosis report scores (FAS core):

$$FAScoreD1 = \frac{1}{R}\sum_{i=1}^{R} \text{far}(n_i) \quad (4)$$

where $n_i$ is the number of suspects in the $i_{th}$ diagnosis report, R is the total number of diagnosis reports, and the f ar($n_i$) can use the same function as the one for the weight factor used for PFA-oriented diagnosis resolution evaluation values (FADRE). A straight line derived by linear regression is derived, which shows a good correlation between the PFA-oriented diagnosis resolution evaluation values (FADRE) and the PFA-oriented diagnosis report scores (FAS core).

In operation 450, the diagnosis resolution analyzer 300 stores the PFA-oriented diagnosis resolution evaluation value in the output database 355.

Optionally, the diagnosis resolution evaluation unit 330 may compute an upper bound value for the PFA (physical failure analysis)-oriented diagnosis resolution evaluation value by averaging weighted sizes of groups of structure-based equivalent faults. The diagnosis resolution evaluation unit 330 can use the following equation to compute the upper bound value $V_{UB}$:

$$V_{UB} = \frac{1}{N}\sum_{i=1}^{K} \text{far}(s_i) * s_i \quad (5)$$

where $s_i$ is the number of structure-based equivalent faults in the $i_{th}$ group of structure-based equivalent faults, K is the total number of the groups of structure-based equivalent faults, N is the total number of faults in the set of faults, and f ar($s_i$) is the weight factor for the $i_{th}$ group of structure-bases equivalent faults. The weight factor f ar($s_i$) should use the same form as the weight factor f ar($n_i$) used for computing the PFA (physical failure analysis)-oriented diagnosis resolution evaluation value.

The diagnosis resolution analyzer 300 may determine whether to modify the circuit design based on the upper bound value. If the upper bound value is too high, it may indicate that there are too many structure-based equivalent faults in a group of structure-based equivalent faults and/or too many large-sized groups of structure-based equivalent faults. A diagnose report will have too many suspects, which cannot be reduced by increasing the number of test patterns employed for diagnosis. Therefore, the circuit design may need to be modified to increase the diagnosis resolution.

The diagnosis resolution analyzer 300 may also determine whether to add more test patterns to the test patterns based on comparing the PFA-oriented diagnosis resolution evaluation value with the upper bound value. Diagnosis may need more detailed test response data to be collected and downloaded from the circuit under test than testing alone. This may significantly increase the testers usage time. Computing the PFA-oriented diagnosis resolution evaluation value can help determine a set of test patterns used for diagnosis that can balance the test costs and the diagnosis resolution requirement. The PFA-oriented diagnosis resolution evaluation value being far smaller than the upper bound value may indicate that more test patterns should be used to increase the diagnosis resolution.

According to some embodiments of the disclosed technology, the diagnosis resolution analyzer 300 may also determine whether to add more test patterns to the test patterns based on the PFA-oriented diagnosis resolution evaluation value alone. For example, if the PFA-oriented diagnosis resolution evaluation value alone is far smaller than "1", it may indicate that the number of test patterns used is not sufficient.

In optional operation 460, the diagnosis resolution analyzer 300 processes the test patterns or the circuit design based at least in part on the PFA-oriented diagnosis resolution evaluation value. The test pattern adjustment unit 340 may add more test patterns into the test patterns, while the design modification unit 350 may modify the circuit design to reduce the number of structure-based equivalent faults.

CONCLUSION

Having illustrated and described the principles of the disclosed technology, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only preferred examples of the technologies and should not be taken as limiting the scope of the disclosed technology. Rather, the scope of the disclosed technology is defined by the following claims and their equivalents. We therefore claim as our disclosed technology all that comes within the scope and spirit of these claims.

What is claimed is:

1. A method, executed by at least one processor of a computer, comprising:
    receiving a circuit design, a set of faults for the circuit design, and test patterns for testing circuits fabricated according to the circuit design;
    performing fault simulation on the circuit design to derive test responses for the set of faults and the test patterns;
    grouping the set of faults into groups of equivalent faults based on the test responses, a group of equivalent faults consisting of faults having the same test responses for all test patterns in the test patterns that can activate the faults;
    computing a PFA (physical failure analysis)-oriented diagnosis resolution evaluation value by averaging weighted sizes of the groups of equivalent faults, weight factors for the groups of equivalent faults with sizes greater than a certain number being smaller than weight factors for rest of the groups of equivalent faults; and
    storing the PFA-oriented diagnosis resolution evaluation value in a non-transitory computer-readable media.

2. The method recited in claim 1, further comprising:
    adding more test patterns to the test patterns to form a new set of test patterns; and
    repeating the performing, the grouping, the computing, and the storing by replacing the test patterns with the new set of test patterns.

3. The method recited in claim 1, further comprising:
    computing an upper bound value for the PFA-oriented diagnosis resolution evaluation value by averaging weighted sizes of groups of structure-based equivalent faults; and
    determining whether to modify the circuit design based on the upper bound value or whether to add more test patterns to the test patterns based on comparing the PFA-oriented diagnosis resolution evaluation value with the upper bound value.

4. The method recited in claim 1, wherein the weight factors for the groups of equivalent faults with sizes smaller than or equal to the certain number are set to be "1".

5. The method recited in claim 4, wherein the weight factors for the groups of equivalent faults with sizes greater than the certain number is computed based on a function decreasing with respect to the size.

6. The method recited in claim 5, wherein the function is an exponential function with a base being a preset value and the exponent being the size.

7. The method recited in claim 1, wherein for each set of collapsed equivalent faults in the set of faults, the performing fault simulation is limited to one fault in the each set of collapsed equivalent faults.

8. The method recited in claim 1, wherein the set of faults are stuck-at faults.

9. The method recited in claim 1, wherein the grouping comprises:
    compressing test responses into test response signatures; and
    comparing test response signatures for different faults to determine equivalent faults.

10. The method recited in claim 9, wherein each of the test response signatures is a 64-bit word.

11. One or more non-transitory computer-readable media storing computer-executable instructions for causing one or more processors to perform a method, the method comprising:
    receiving a circuit design, a set of faults for the circuit design, and test patterns for testing circuits fabricated according to the circuit design;
    performing fault simulation on the circuit design to derive test responses for the set of faults and the test patterns;
    grouping the set of faults into groups of equivalent faults based on the test responses, a group of equivalent faults consisting of faults having the same test responses for all test patterns in the test patterns that can activate the faults;

computing a PFA (physical failure analysis)-oriented diagnosis resolution evaluation value by averaging weighted sizes of the groups of equivalent faults, weight factors for the groups of equivalent faults with sizes greater than a certain number being smaller than weight factors for rest of the groups of equivalent faults; and storing the PFA-oriented diagnosis resolution evaluation value in a non-transitory computer-readable media.

12. The one or more non-transitory computer-readable media recited in claim 11, wherein the method further comprises:

adding more test patterns to the test patterns to form a new set of test patterns; and repeating the performing, the grouping, the computing, and the storing by replacing the test patterns with the new set of test patterns.

13. The one or more non-transitory computer-readable media recited in claim 11, wherein the method further comprises:

computing an upper bound value for the PFA-oriented diagnosis resolution evaluation value by averaging weighted sizes of groups of structure-based equivalent faults; and determining whether to modify the circuit design based on the upper bound value or whether to add more test patterns to the test patterns based on comparing the PFA-oriented diagnosis resolution evaluation value with the upper bound value.

14. The one or more non-transitory computer-readable media recited in claim 11, wherein the weight factors for the groups of equivalent faults with sizes smaller than or equal to the certain number are set to be "1".

15. The one or more non-transitory computer-readable media recited in claim 14, wherein the weight factors for the groups of equivalent faults with sizes greater than the certain number is computed based on a function decreasing with respect to the size.

16. The one or more non-transitory computer-readable media recited in claim 15, wherein the function is an exponential function with a base being a preset value and the exponent being the size.

17. The one or more non-transitory computer-readable media recited in claim 11, wherein for each set of collapsed equivalent faults in the set of faults, the performing fault simulation is limited to one fault in the each set of collapsed equivalent faults.

18. The one or more non-transitory computer-readable media recited in claim 11, wherein the set of faults are stuck-at faults.

19. The one or more non-transitory computer-readable media recited in claim 11, wherein the grouping comprises:

compressing test responses into test response signatures; and comparing test response signatures for different faults to determine equivalent faults.

20. The one or more non-transitory computer-readable media recited in claim 19, wherein each of the test response signatures is a 64-bit word.

* * * * *